(12) United States Patent
Sivaraj et al.

(10) Patent No.: US 11,765,488 B1
(45) Date of Patent: Sep. 19, 2023

(54) PATH FLOW OF TELEMETRY FLOW DATA FOR BARE METAL SERVERS

(71) Applicant: Juniper Networks, Inc., Sunnyvale, CA (US)

(72) Inventors: SelvaKumar Sivaraj, Sunnyvale, CA (US); Prasad Miriyala, San Jose, CA (US); Biswajit Mandal, Kanata (CA)

(73) Assignee: Juniper Networks, Inc., Sunnyvale, CA (US)

(*) Notice: Subject to any disclaimer, the term of this patent is extended or adjusted under 35 U.S.C. 154(b) by 64 days.

(21) Appl. No.: 17/649,316

(22) Filed: Jan. 28, 2022

Related U.S. Application Data (60) Provisional application No. 63/265,639, filed on Dec. 17, 2021.

(51) Int. Cl.
*H04Q 9/00* (2006.01)

(52) U.S. Cl.
CPC .................................. *H04Q 9/00* (2013.01)

(58) Field of Classification Search
CPC ........................................................ H04Q 9/00
See application file for complete search history.

(56) References Cited

U.S. PATENT DOCUMENTS

| | | | | |
|---|---|---|---|---|
| 7,478,156 B1* | 1/2009 | Pereira | ................. | H04L 43/026 709/224 |
| 2009/0086630 A1* | 4/2009 | Hamada | ............. | H04L 63/0272 370/253 |
| 2015/0236935 A1* | 8/2015 | Bassett | ................... | H04L 41/14 709/224 |
| 2017/0262300 A1* | 9/2017 | Brandwine | ............. | H04L 43/20 |
| 2018/0063178 A1* | 3/2018 | Jadhav | ................ | H04L 63/1433 |
| 2020/0159947 A1* | 5/2020 | Shenefiel | ............ | H04L 63/1425 |
| 2020/0162329 A1* | 5/2020 | Mermoud | ........... | H04L 41/0893 |
| 2022/0342831 A1* | 10/2022 | Charles | ............... | G06F 9/45533 |
| 2023/0114898 A1* | 4/2023 | Kamisetty | ........... | H04L 47/2441 370/235 |

OTHER PUBLICATIONS

"EVPN statistics export using JTI," Juniper Networks, Inc., Juniper Networks Pathfinder Feature Explorer, 3 pp., Retrieved from the Internet Nov. 15, 2021: URL: https://apps.juniper.net/feature-explorer/feature-info.html?Key=9490&fn=EVPN statistics export using JTI.

* cited by examiner

*Primary Examiner* — Ojiako K Nwugo
(74) *Attorney, Agent, or Firm* — Shumaker & Sieffert, P.A.

(57) ABSTRACT

A method includes receiving, by a network analyzer implemented in circuitry, from a network device of a plurality of network devices, a sensor message for telemetry flow data. The sensor message indicates an interface index for a network interface, a virtual network identifier associated with a virtual network, and an IP address. The method further includes receiving, by the network analyzer, from the network device, a telemetry flow message for the telemetry flow data. The method further includes, in response to determining that the telemetry flow message includes an indication of an interface index that matches the interface index of the sensor message and that the telemetry flow message includes an indication of a virtual network identifier that matches the virtual network identifier of the sensor message, setting, by the network analyzer, the IP address as the source of the telemetry flow data.

20 Claims, 8 Drawing Sheets

| No. | Time | Source | Destination | Protocol | Length | Info |
|---|---|---|---|---|---|---|
| 10 | 2.782528 | 192.168.11.254 | 192.169.13.3 | sFlow | 288 | VS, agent 10.87.110.112, sub-agent ID 16, seq 2575, 1 samples |
| 11 | 3.320894 | 192.168.10.254 | 192.169.13.3 | sFlow | 288 | VS, agent 10.87.110.114, sub-agent ID 16, seq 7689, 1 samples |
| 12 | 3.320954 | 192.168.10.254 | 192.169.13.4 | sFlow | 288 | VS, agent 10.87.110.114, sub-agent ID 16, seq 7689, 1 samples |
| 13 | 5.024521 | 10.87.110.115 | 192.169.13.3 | sFlow | 204 | VS, agent 10.87.110.115, sub-agent ID 0, seq 1833, 1 samples |

```
Agent address type: IPv4 (1)
Agent address: 10.87.110.112
Sub-agent ID: 16
Sequence number: 2575
NumSamples: 1
▽ Flow sample, seq 1189
    0000 0000 0000 0000 0000 0000 0000 0001 = Enterprise: standard sFlow (0)
    0000 0000 0000 0000 0000 0000 0000 0000 = sFlow sample type: Flow sample (1)
    Samplie Length (byte): 208
    Sequence number: 1189
    0000 0000 0000 0000 0000 0000 0001 0001 = Source ID class: 0
    0000 0000 0000 0000 0000 0010 0000 1001 = Index: 521
    Sampling rate: 1 out of 200 packets
    Sample pool: 237800 total packets
    Dropped packets: 0
    Input interface (ifIndex): 521
    .000 0000 0000 0000 0000 0010 0000 0100 = Output interface (ifIndex): 516
    Flow record: 2
  ▽ Raw packet header
        0000 0000 0000 0000 0000 0000 0000 0000 ..¦. ..... = Enterprise: standard sFlow (0)
        Format: Raw packet header (1)
        Flow data length (byte): 144
        Header protocol: Ethernet (1)
        Frame Length: 156
        Payload removed: 4
        Original packet length: 128
      ▽ Header of sampled packet: 64c3d67aad107c2586fb58a88100000008004500008613a...
        ▷ Ethernet II, Src: JuniperN_fb:58:a8 (7c:25:86:fb:58:a8), Dst: JuniperN_7a:ad:10 (64:c3:d6:7a:ad:10)
        ▷ 802.10 Virtual LAN, PRI: 0, DEI: 0, ID: 0
        ▷ Internet Protocol version 4, Src: 192.162.10.15, Dst: 192.168.11.16
        ▷ User Datagram Protocol, Src Port: 49424, Dst Port: 4789
        ▽ Virtual extensible Local Area Network
          ▷ Flags: 0x0800, VXLAN Network ID (VNI)
            Group Policy ID: 0
            VXLAN Network Identifier (VNI): 14
            Reserved: 0
        ▷ Ethernet II, Src: 02:4d:ad:f1:24:23 (02:4d:ad:f1:24:23), Dst: MS-NLB-PhysServer-32_0f:14:6e:11:05 (02:2f:14:6e:11:05)
        ▷ Internet Protocol Version 4, Src: 55.55.55.5, Dst: 55.55.55.6
        ▷ Internet Control Message Protocol
```

FIG. 4

```
{
    "virtual-port-group": {                                                            ╱— 502
        "physical_interface_refs": [
            {
                "to": [
                    "default-global-system-config",
                    "leaf1-5c4-qfx3",
                    "xe-0/0/38"
                ],
                "href": "http://localhost:9084/physical-interface/a5351282-712c-4fcf-83c4-a1cb053edf15",
                "attr": { ... }, // 1 item
                "uuid": "a5351282-712c-4fcf-83c4-a1cb053edf15"
            },
            {...} // 4 items
        ],
        "display_name": "vpg1",
        "uuid": "6425c29b-fef1-4321-8fdf-7fa77b5e90eb",
        "parent_uuid": "d0793b06-1d50-43ec-895a-52a106a3e9a6",
        "parent_href": "http://localhost:9084/fabric/do793b06-1d50-43ec-895a-52a106a3e9a6",
        "parent_type": "fabric",
        "virtual_machine_interface_refs": [...], // 1 item
        "perms2": {...}, // 4 items
        "href": "http://localhost:9084/virtual-port-group/6425c29b-fef1-4321-8fdf-7fa77b5e90eb",
        "id_perms": {...}, // 8 items
        "fq_name": [...], // 3 items
        "annotations": {
            "key_value_pair": [
                {
                    "value": "e9a1d207-0cdc-4eea-8a06-fbe468769932",
                    "key": "validation:enterprise/vn:c6f0981e-3fd2-4ba7-9669-1c78980f4fcf/vlan_id:100"
                }
            ]
        },
        "name": "vpg1"
    }
}
```

FIG. 5

```
{
- virtual-network: {
    virtual-network_network_id: 15,
    parent_uuid: "1a8ac0f9-2fdd-4e1a-87fe-c11c15797a76",
    address_allocation_mode: "user-defined-subnet-only",
    igmp_enable: false,
    parent_type: "project",
    href: "http://localhost:9084/virtual-network/c6f0981e-3fd2-4ba7-9669-1c78980f4fcf",
    mac_learning_enabled: false,
    fabric_snat: false,
    pbb_etree_enable: false,
    display_name: "int-vn-1",
    uuid: "c6fo981e-3fd2-4ba7-9669-1c78980f4fcf",
  + id_perms: { ... },
  + instance_ip_back_refs: [ ... ],
    multi_policy_service_chains_enabled: false'
  + virtual_network_properties: { ... },
    ecmp_hashing_include_fields: { },
  + virtual_machine_interface_back_refs: [ ... ],
    parent_href: "http://localhost:9084/project/1a8ac0f9-2fdd-4e1a-87fe-c11c15797a76",
  + perms2: { ... },
  + fq_name: [ ... ],
  + routing_instances: [ ... ],
  + intent_map_refs: [ ... ],
  + virtual_network_routed_properties: { ... },
    name: "int-vn-1",
    router_external: false,
    mac_ip_learning_enable: false,
    pbb_evpn_enable: false,
    flood_unknown_unicast: false,
    layer2_control_word: false,
  + network_ipam_refs: [ ... ],
    is_shared: false
  }
}
```

PATH FLOW OF TELEMETRY FLOW DATA FOR BARE METAL SERVERS

This application claims the benefit of U.S. Provisional Patent Application No. 63/265,639, filed 17 Dec. 2021, the entire contents of which is incorporated herein by reference.

TECHNICAL FIELD

This disclosure relates to computer networks, and more particularly, to managing network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

A sensor device may collect Internet protocol (IP) network traffic as the traffic enters and/or exits an interface and may output a telemetry packet based on the IP network traffic. By analyzing the data provided by the telemetry packet, the user (such as a network administrator) can determine telemetry flow data such as, the source and destination of network traffic, a class of service of the network traffic, and a cause of congestion of the network traffic. The user and/or a controller device may use an intent to modify the configuration of network devices using the telemetry flow data.

SUMMARY

In general, this disclosure describes techniques to find the path of a flow from a Bare Metal Server (BMS) to another BMS. For example, a network analyzer may map, based on a sensor message, an interface index for a network interface and a virtual network identifier associated with a virtual network to an IP address. In this example, the network analyzer may determine a source IP address for a telemetry flow message (e.g., an sFlow message) based on the mapping. In this way, the network analyzer may manage telemetry flow data for the traffic from a BMS to another BMS, particularly in instances that do not use a Contrail vRouter Agent, and/or when there is no knowledge of the source and destination virtual network information from the sFlow packet. Moreover, the network analyzer may map a virtual port group (VPG) for the telemetry flow data based on configuration information (e.g., a VPG object). In this way, the network analyzer may use the VPG name to IP Address mapping, from the sFlow packet, to derive the path between the traffic generated by a BMS to another BMS.

In some examples, a network analyzer may be configured to avoid duplicate or double counting of traffic when enabling ingress and egress sampling and based on the traffic flow use the either egress or ingress sampling data or a combination of egress and ingress sampling data. For example, the network analyzer may determine whether the source of the telemetry flow data and the destination of the telemetry flow data are within a single fabric (e.g., east-to-west traffic). In this example, the network analyzer may add ingress telemetry flow data to a telemetry data store and refrain from adding egress telemetry flow data to the telemetry data store. In some examples, the network analyzer may add egress telemetry flow data to the telemetry data store and refrain from adding ingress telemetry flow data to the telemetry data store.

In one example, a method includes receiving, by a network analyzer implemented in circuitry, from a network device of a plurality of network devices, a sensor message for telemetry flow data. The sensor message indicates an interface index for a network interface, a virtual network identifier associated with a virtual network, and an IP address. The method further includes receiving, by the network analyzer, from the network device, a telemetry flow message for the telemetry flow data. The method further includes, in response to determining that the telemetry flow message includes an indication of an interface index that matches the interface index of the sensor message and that the telemetry flow message includes an indication of a virtual network identifier that matches the virtual network identifier of the sensor message, setting, by the network analyzer, the IP address as the source of the telemetry flow data.

In another example, a device includes a device comprising processing circuitry and memory comprising instructions that, when executed, cause the processing circuitry to receive, from a network device of a plurality of network devices, a sensor message for telemetry flow data. The sensor message indicates an interface index for a network interface, a virtual network identifier associated with a virtual network, and an IP address. The processing circuitry is further configured to receive from the network device, a telemetry flow message for the telemetry flow data. The processing circuitry is further configured to, in response to determining that the telemetry flow message includes an indication of an interface index that matches the interface index of the sensor message and that the telemetry flow message includes an indication of a virtual network identifier that matches the virtual network identifier of the sensor message, setting, by the network analyzer, the IP address as the source of the telemetry flow data.

In one example, a non-transitory computer-readable storage medium comprises one or more instructions that cause processing circuitry to receive, from a network device of a plurality of network devices, a sensor message for telemetry flow data. The sensor message indicates an interface index for a network interface, a virtual network identifier associated with a virtual network, and an IP address. The one or more instructions further cause the processing circuitry to receive from the network device, a telemetry flow message for the telemetry flow data. The one or more instructions further cause the processing circuitry to, in response to determining that the telemetry flow message includes an indication of an interface index that matches the interface index of the sensor message and that the telemetry flow message includes an indication of a virtual network identifier that matches the virtual network identifier of the sensor message, setting, by the network analyzer, the IF address as the source of the telemetry flow data.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a diagram of an example of an sFlow packet, according to techniques described in this disclosure.

Like reference characters refer to like elements throughout the figures and description.

DETAILED DESCRIPTION

Figure 1:
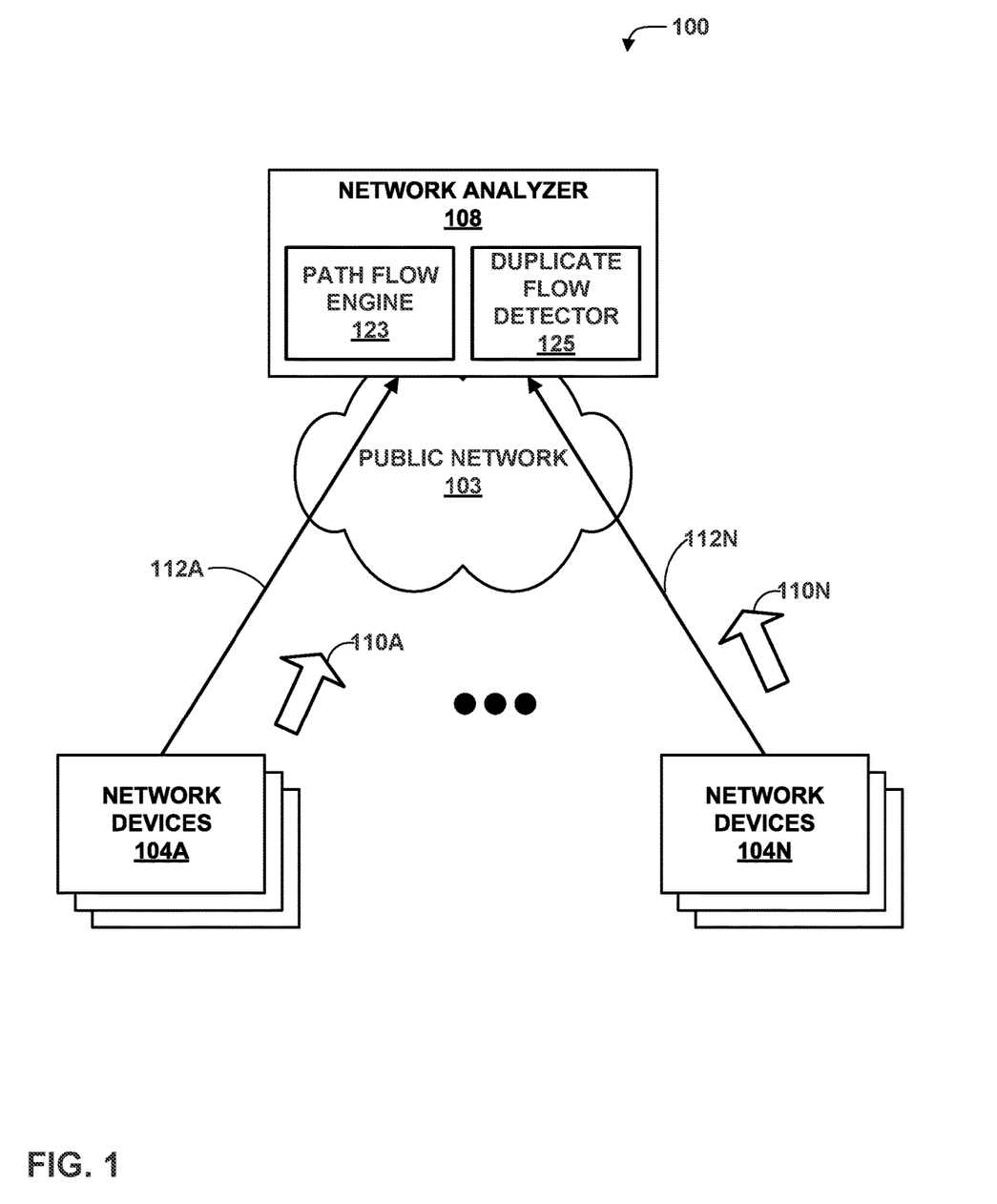
FIG. 1 is a block diagram illustrating an example system in which examples of the techniques described herein may be implemented.

FIG. 1 is a block diagram illustrating an example system 100 in which examples of the techniques described herein may be implemented. Network devices 104 may stream telemetry flow data to a network analyzer 108, e.g., using a network flow collection protocol such as NetFlow or a packet sampling protocol such as sampled flow ("sFlow").

Network analyzer 108 may be configured to receive telemetry flow data for network devices 104. In some examples, telemetry flow data output by network devices 104A may indicate a set of samples of a traffic flow of packets exchanged by network device 104A. For instance, the telemetry flow data may represent a set of samples of packets flowing from a source IP address to a destination IP address. Telemetry flow data may be compliant with NetFlow, other flow protocols may be used, such as, for example, sampled flow (sFlow), Juniper flow (Mow), or another flow protocol. Network analyzer 108 may be configured to use the telemetry flow data to monitor traffic flow to provide visibility into the use of a network. For example, network analyzer 108 may use the telemetry flow data to perform one or more of troubleshooting network problems, controlling congestion, perform a security and audit analysis, or perform route profiling.

Network devices 104 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Network devices 104 may include one or more sensor devices configured to generate a telemetry packet indicating telemetry flow data for a plurality of packets output by a respective network element. In some examples, each one of network devices 104 may be associated with a respective set of sensor devices that are separate (e.g., a separate circuit board or a separate processing device) from the network devices 104. While described in this disclosure as transmitting, conveying, or otherwise supporting packets, network devices 104 may transmit data according to any other discrete data unit defined by any other protocol, such as a cell defined by the Asynchronous Transfer Mode (ATM) protocol, or a datagram defined by the User Datagram Protocol (UDP). Communication links interconnecting network devices 104 may be physical links (e.g., optical, copper, and the like), wireless, or any combination thereof.

Network devices 104 may be connected to network analyzer 108 via a public network 103 (e.g., the Internet). The public network may include, for example, one or more client computing devices. The public network may provide access to web servers, application servers, public databases, media servers, end-user devices, and other types of network resource devices and content. The public network may provide access to network analyzer 108. Network analyzer 108 may represent one or more computing devices (e.g., a server, a computer, or a cloud).

In the example of FIG. 1, network analyzer 108 may subscribe to one or more streams of telemetry flow data 110A-110N (also referred to herein as simply, "telemetry flow data 110," from network devices 104. For instance, each of network devices 104A may send telemetry flow data 110 (e.g., sFlow data) as a sample once every interval (e.g., a 1 second interval).

Network analyzer 108 may use telemetry flow data 110 to analyze characteristics of system 100, e.g., to modify a configuration of network devices 104, to implement additional or alternative network services, to determine whether to add, remove, or modify network devices or links between the network devices, or other such decisions.

Path flow engine 123 may be configured to find a path of a flow from a BMS to another BMS. For example, path flow engine 123 may map, based on a sensor message, an interface index for a network interface and a virtual network identifier (vni) associated with a virtual network to an IP address. Path flow engine 123 may determine that a telemetry flow message includes an indication of an interface index that matches the interface index of the sensor message and that the telemetry flow message includes an indication of a virtual network identifier that matches the virtual network identifier of the sensor message. In this example, path flow engine 123 may determine a source IP address for a telemetry flow message (e.g., an sFlow message) based on the mapping. For instance, path flow engine 123 may set the IP address as the source of the telemetry flow data. In this way, path flow engine 123 may manage telemetry flow data for the traffic from a BMS to another BMS, particularly in instances that do not use a Contrail vRouter Agent, and/or when there is no knowledge of the source and destination virtual network information from the sFlow packet. Moreover, the network analyzer may map a virtual port group (VPG) for the telemetry flow data based on configuration information (e.g., a VPG Object). In this this way, path flow engine 123 may use the VPG name to IP Address mapping, from the sFlow packet, to derive the path between the traffic generated by a BMS to another BMS.

In some systems, if ingress and egress sampling is configured at different time stamps, and the sampling rate is different, then the system may get two different packets at two different time stamps. As a sampling rate can be the same or a configuration time is different, by for example N-milliseconds, for both ingress or egress at times t1 and t2, then the system would get two samples with ingress and egress sampling details at two different points of time. In such systems, enabling only an ingress side may result in a miss when egress should be counted, in the case of multi-homing when a request path and response path is different.

Duplicate flow detector 125 may be configured to avoid duplicate or double counting of traffic when enabling ingress and egress sampling and based on the traffic flow use the either egress or ingress sampling data or a combination of egress and ingress sampling data. For example, duplicate flow detector 125 may determine whether the source of the telemetry flow data and the destination of the telemetry flow data are within a single fabric (e.g., east-to-west traffic). Duplicate flow detector 125 may determine that network devices are within a single fabric, for example, using a mac and MAC+IP Ethernet virtual private network (EVPN) information, Duplicate flow detector 125 may determine that telemetry flow data is east-to-west traffic when both the source and destination reside in the Fabric. In this example, duplicate flow detector 125 may add ingress telemetry flow data to a telemetry data. store and refrain from adding egress telemetry flow data to the telemetry data store. In some examples, duplicate flow detector 125 may add egress telemetry flow data to the telemetry data store and refrain from adding ingress telemetry flow data to the telemetry data store. Duplicate flow detector 125 may determine that telemetry flow data is north-to-south traffic (e.g., not east-to-west traffic) when the source or destination is outside of the Fabric. Duplicate flow detector 125 may use mac/IP table binding from network devices (e.g., switches) to the sFlow records to augment topology information.

Figure 2:
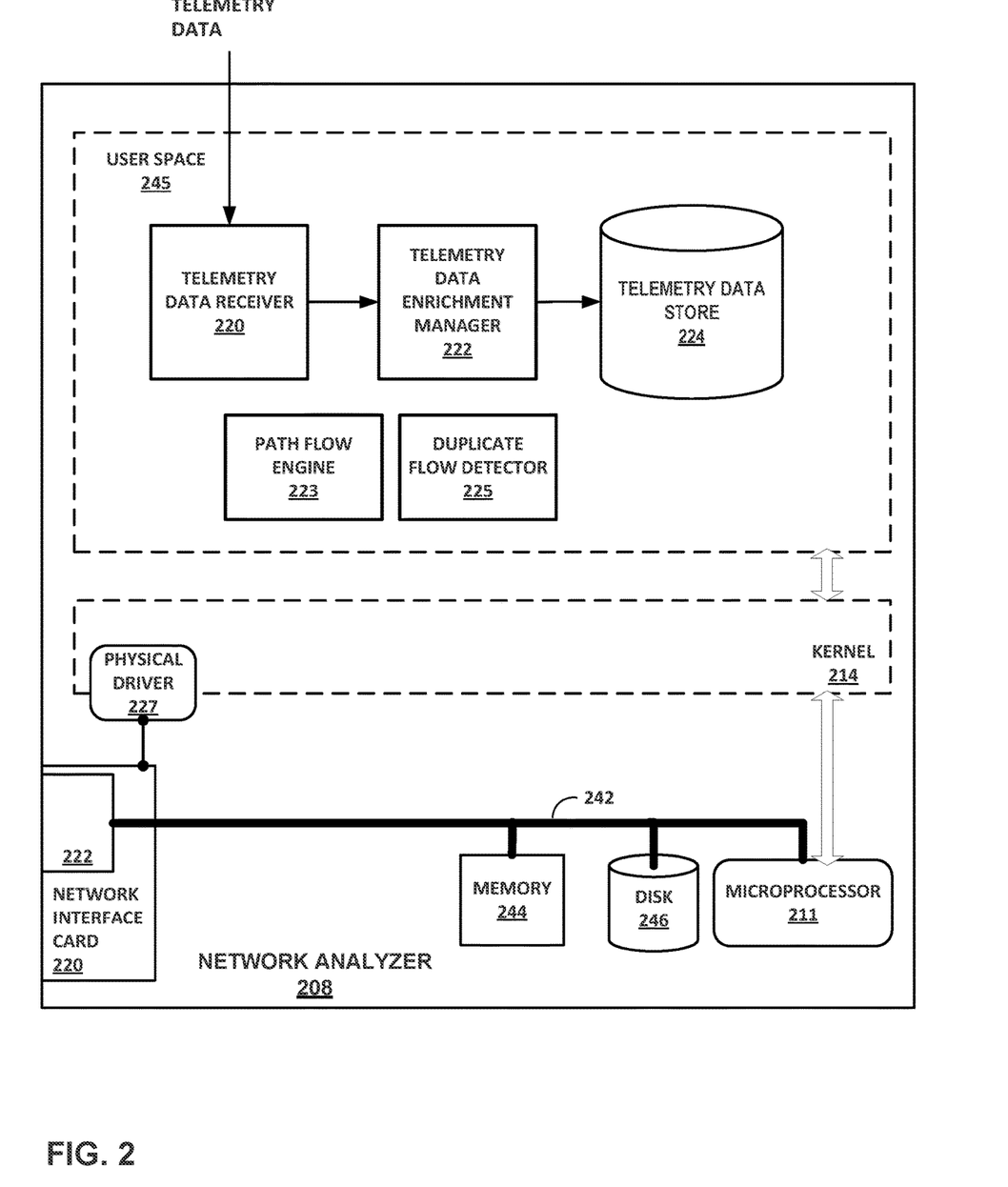
FIG. 2 is a block diagram of an example computing device operating as an instance of a network analyzer, according to techniques described in this disclosure.

FIG. 2 is a block diagram of an example computing device operating as an instance of a network analyzer, according to techniques described in this disclosure. Computing device 200 an example instance of controller 5 for a virtualized computing infrastructure. Computing device 200 of FIG. 2 may represent one or more real or virtual servers.

Telemetry flow data receiver 220, telemetry flow data enrichment manager 222, and telemetry data store 224, although illustrated and described as being executed by a single computing device 200, may be distributed among multiple computing devices 200 that make up a computing system or hardware/server cluster. Each of the multiple computing devices 200, in other words, may provide a hardware operating environment for one or more instances of any one or more of telemetry flow data receiver 220, telemetry flow data enrichment manager 222, and telemetry data store 224.

Telemetry flow data receiver 220 may be configured to receive telemetry flow data from network devices 104 of FIG. 1. For example, telemetry flow data receiver 220 may comprise a gRPC remote procedure call (gRPC) edge receiver configured to receive the telemetry flow data network devices 104. Telemetry packets may be compliant with, for example, NetFlow, OpenConfig, Juniper Telemetry Interface (JTI) Native, netconf, Simple Network Management Protocol(SNMP), syslog, and sFlow. Telemetry flow data may have an associated transmission rate and/or a receiving rate. Telemetry flow data may include metadata indicating a tuple (e.g., a 5-tuple or a 2-tuple) associated with the telemetry flow data. In some examples, the metadata included in telemetry flow data may include one or more of a tenant identifier or a location identifier.

Telemetry flow data enrichment manager 222 may be configured to convert the telemetry flow data to a system format for network analyzer 208. For example, telemetry flow data enrichment manager 222 may convert sflow UDP datagrams to protocol buffers (protobufs) for processing by Kafka. Telemetry flow data enrichment manager 222 may convert the protobufs to an SQL format for storage at telemetry data store 224. For instance, telemetry flow data enrichment manager 222 may be configured to convert a device identifier indicated in the aggregated telemetry flow data into a network device identifier. Telemetry flow data enrichment manager 222 may be configured to correlate telemetry flow data to a server (e.g., VMware or a hypervisor), Telemetry flow data enrichment manager 222 may maintain aggregated telemetry flow data for one or more of network devices, server collection, instance collection, network device to BMS connections, or a project list.

Telemetry flow data enrichment manager 222 may be configured to store the converted telemetry flow data in telemetry data store 224.

Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). A frontside bus may in some cases couple microprocessor 210 and memory device 244. In some examples, bus 242 may couple memory device 244, microprocessor 210, and MC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, MC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245. Kernel 214 includes a physical driver 227 to use the network interface card 230.

Path flow engine 223 may be configured to find a path of a flow from a BMS to another BMS. For example, path flow engine 223 may map, based on a sensor message, an interface index for a network interface and a virtual network identifier (vni) associated with a virtual network to an IP address. In this example, path flow engine 223 may receive, from network device 104A, a telemetry flow message for the telemetry flow data. The telemetry flow message may include an sFlow message. For example, network analyzer 108 may receive sFlow data that includes an outer and/or an inner header of the packet which network analyzer 108 may sample along with a Simple Network Management Protocol (SNMP) if-index of the ingress and egress interface of the device on which the packet has arrived and sent out of the device, respectively.

Path flow engine 223 may, in response to a determination that the telemetry flow message includes an indication of an interface index that matches the interface index of a sensor message and that the telemetry flow message includes an indication of a virtual network identifier that matches the virtual network identifier of the sensor message, set the address as the source of the telemetry flow data (708). The source of the telemetry flow data may comprise a BMS. For example, path flow engine 123 may check if there is any match between an ingress SNMP if-index of the sFlow packets to the map as created by consuming gNMI messages. If a match is found, path flow engine 123 may designate that mapped IP-address as remote source of the packet. In this way, path flow engine 223 may manage telemetry flow data for the traffic from a BMS to another BMS, particularly in instances that do not use a Contrail vRouter Agent, and/or when there is no knowledge of the source and destination virtual network information from the sFlow packet. Moreover, the network analyzer may map a virtual port group (VPG) for the telemetry flow data based on configuration information (e.g., a VPG object). In this way, path flow engine 223 may use the VPG name to IP Address mapping, from the sFlow packet, to derive the path between the traffic generated by a BMS to another BMS.

Duplicate flow detector 225 may be configured to help to avoid duplicate or double counting of traffic when enabling ingress and egress sampling and based on the traffic flow use the either egress or ingress sampling data or a combination of egress and ingress sampling data. In some systems, egress and ingress sampling with sFlow is enabled in the leaf devices in the EVPN fabric to collect flow information for traffic from different kind flows. Enabling ingress and egress sampling may introduce double counting for traffic from east to west in the EVPN fabric. This double counting of traffic may happen as the configuration is enabled at different times at each of the devices. Even if there is a way to synchronize the configuration the actual sampling occurs at different rate and time. The application processing the sFlow records may not determine if the egress sampling is a duplicate sample of the same packet or a different sampling. This leads to double counting and incorrect statistics.

Duplicate flow detector 225 may correlate EVPN telemetry and sFlow records. Corelating the information from EVPN telemetry and sFlow sampling Contrail insights can determine whether to use egress and ingress samples for a specific flow or not. From the EVPN telemetry, duplicate flow detector 225 may determine the location of the source and destination in the flow can be determined. If the source and destination are in the same Fabric then it is east to west traffic and only ingress sFlow data is sufficient for the said flow. Duplicate flow detector 225 may help to resolves the problem with double counting. If either the source or destination is outside of the fabric then it is a north-south flow and all sFlow records can be used.

Computing device 200 may be coupled to a physical network switch fabric that includes an overlay network that extends switch fabric from physical switches to software or "virtual" routers of physical servers coupled to the switch fabric. Computing device 200 may use one or more dedicated virtual networks to configure minion nodes of a cluster.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

FIG. 3 is a diagram of an example of an sFlow packet, according to techniques described in this disclosure. FIG. 3 is described with reference to FIGS. 1-2 for example purposes only. In accordance with the techniques of the disclosure, network analyzer 108 may be configured to find the path of a flow from a BMS to another BMS without using a Contrail vRouter.

In general, flows are a "set of packets which share a common property". A flow may be based on 5 tuples, a source IP address, a destination IP address, a source port, a destination port, and a protocol. When a network device of network devices 104 (e.g., a virtual machine) sends or receives IP traffic, forward and reverse flow, the network devices generate a flow entry. When using a Contrail vRouter, the network device sends the packet to a Contrail vRouter agent. The Contrail vRouter agent also creates a flow entry for the reverse direction, where relevant. The Contrail vRouter agent then sends the flow to network analyzer 108 to store in the telemetry datastore (e.g., telemetry data store 224 of network analyzer 208 of FIG. 2) for further analysis. This Contrail flow contains all the information about source and destination virtual machine IP addresses, virtual networks. The virtual network creates a logical partition among the tenants. In Contrail networking, a virtual port group (VPG) is a group of one or more physical interfaces attached to one or more virtual network interfaces.

The above Contrail vRouter solution (e.g., Contrail insights flows) uses contrail flow generated by a Contrail vRouter agent and sampled flow, sFlow to find the path of a flow between any Virtual Machine (VM) to another Virtual Machine. The Contrail vRouter agent may work as a compute node and the VMs are launched on that compute node such that any traffic generated by the VMs pass through this compute node. In this way, the Contrail vRouter agent has the knowledge about this traffic, and may send the contrail flow, containing virtual network information, to the Contrail Insights Flows Collector.

The sFlow technology is a monitoring technology for high-speed switched or routed networks. In snow monitoring technology, network devices 104 may collect samples of network packets and send them, for example, in a UDP datagram to a Contrail Insights Flows Collector.

When there is continuous traffic between the VM to another VM and if packets are routed via network devices 104, network devices 104 may send sFlow packets, containing host/compute IP in the outer header and VM IPs in the inner header to the Contrail Insights flows collector.

In sFlow packet 302, where 10.87.110.112 is the network device sending this sFlow data. The IP fields may be the same for the sFlow packets coming from different network devices. So, if the same flow tuples are sent by N number (e.g., where N is a positive integer) of network devices, then the path contains N numbers of network devices, now from the topology network analyzer 108 may determine the path between network devices.

Contrail flow may include the virtual network information along with these inner and outer IP header details such that using contrail-flow a Contrail Insights Flows Collector can correlate the path. But if the path does not contain a Contrail vRouter, (e.g., traffic across two BMSs), the Contrail Insights flows collector may not be able to find the path between host and network device.

Figure 4:
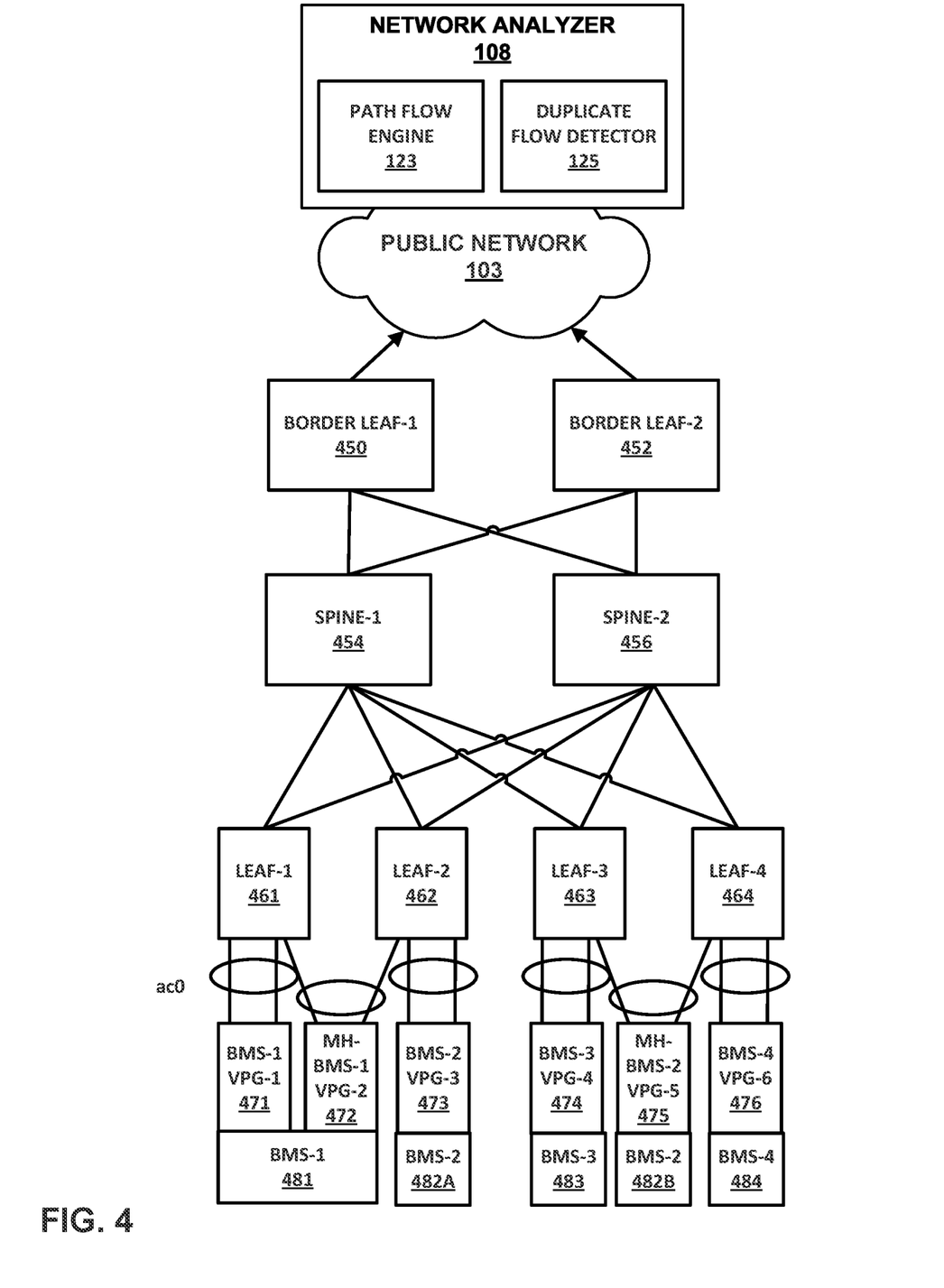
FIG. 4 is a block diagram illustrating an example system for a path between two bare metal servers, according to techniques described in this disclosure.

FIG. 4 is a block diagram illustrating an example system for a path between two bare metal servers, according to techniques described in this disclosure. FIG, 4 is described with reference to FIGS. 1-3 for example purposes only. In the example of FIG. 4, a leaf-spine architecture is used to connect BMSs 481, 482 (illustrated as BMS 482A, 482B), 483, and 484. In this example, BMS 481 may represent a first network device including a port 471 (VPG-1) connected to leaf 461 and including port 472 (VPG-2) connected to leafs 461, 462. BMS 482 may represent a second network device including a port 473 (VPG-3) connected to leaf 462 and including port 475 (VPG-5) connected to leafs 463, 464. In this example, BMS 483 may represent a third network device including a port 474 (VPG-4) connected to leaf 463. BMS 484 may represent a fourth network device including a port 476 (VPG-6) connected to leaf 464. As shown, leafs 461-464 are each connected to a spine 454 and a spine 456. Spines 454, 456 are each connected to a boarder leaf 450 and a border leaf 452. Border leafs 450, 452 are connected to network analyzer 108 using public network 103.

A VPG may enable the selection of multiple interfaces on the same device or on different devices. A VPG is similar to the link aggregation group (LAG) but supports both LAG and multihoming depending on whether you select the interfaces on the same devices or on different devices. In Contrail, the IP address of the VPG is not known. In Contrail, the user specifies a specific name to a VPG.

As there may be no knowledge of a VPG name to IP Address mapping, from the sFlow packet, some systems may not derive the path between the traffic generated by one of BMSs 481-484 to another one of BMSs 481-484. In some examples, as the traffic from one of BMSs 481-484 to another one of BMSs 481-484 does not contain Contrail vRouter agent, some systems may not determine the source and destination virtual network information from the sFlow packet. In such systems, the system may not find the path connected between the network device and host from the sFlow data.

In accordance with the techniques of the disclosure, network analyzer 108 may be configured to determine a path flow between BMSs 481-484. In this example, network analyzer 108 may be configured with an indication of the network device topology (e.g., the leaf-spine architecture shown in FIG. 4 or another architecture).

Network analyzer 108 (e.g., one or more flow collectors) may collect sFlow packets sent by a set of network devices (e.g., BMSs 481-484), which receive the packet sent from source to destination. This sFlow packet may include the IP-address of the network device which originated the sFlow packet (e.g., an agent address in the sflow packet), but the sFlow packet may include all the inner and outer headers intact for correlation in all sFlow packets sent by different network devices.

Network analyzer 108 (e.g., one or more flow collectors) may map, from the agent address, all the network devices through which the sFlow packet traversed by comparing the 5 tuples in the sFlow packet (e.g., source IP, destination IP, source port, destination port, protocol along with some overlay information). Network analyzer 108 may determine a link between a leaf of leafs 461-464 and a BMS of BMSs 481-484 as follows. Network analyzer 108 (e.g., one or more flow collectors) may listen on sFlow port for sflow messages and also subscribes to a gNMI sensor messages (/network-instances/network-instance/macip-table) and /network-instances/ network-instance[instance-name='name']/protocols/protocol/evpn/ethernet-segment/ over GRPC channel.

Network analyzer 108 (e.g., one or more flow collectors) may consume the gNMI sensor messages sent by the leaf network device, the response from macip-table sensor includes the below information:
- interface: Name of the interface on which the mac-ip address is learnt, it is local to the leaf
- ip-address: IP address associated with the EVPN routing instance, it is remote to this leaf which it is connected to
- Vni: VxLan network identifier
- Flan id: vlan-id associated with the virtual network.
- The response from ethernet-segment sensor contains the additional ethernet segment identifier as well which helps to correlate in case of multi homing environment.

After consuming the gNMI sensor messages, network analyzer 108 (e.g., one or more flow collectors) may create a map with index/key as interface-index and vlan-id and value as IP-address and vni. Network devices (e.g., leafs 461-464) may send sFlow data to network analyzer 108 (e.g., one or more flow collectors). This sFlow data may include outer and inner header of the packet which it samples along with Simple Network Management Protocol (SNMP) ifIndex of the ingress and egress interface of the device on which the packet has arrived and sent out of the network device, respectively.

After receiving the sFlow messages from the leaf, network analyzer 108 (e.g., one or more flow collectors) may check if there is any match between ingress SNMP if-index and vlan id (if available) of the sflow packets to the map as created by consuming gNMI messages. If a match is found, network analyzer 108 (e.g., one or more flow collectors) may designate that mapped IP-address as a remote source of the sFlow packet. Network analyzer 108 (e.g., one or more flow collectors) may check if there is any match between egress SNIMP if-index and vlan id (if available) of the sFlow packets to the map as created by consuming gNMI messages. If a match is found, network analyzer 108 (e.g., one or more flow collectors) may designate that mapped IP-address as remote destination of the sFlow packet. In this way, network analyzer 108 may identify a link between leafs 450, 452 and BMSs 481-484.

Figure 5:
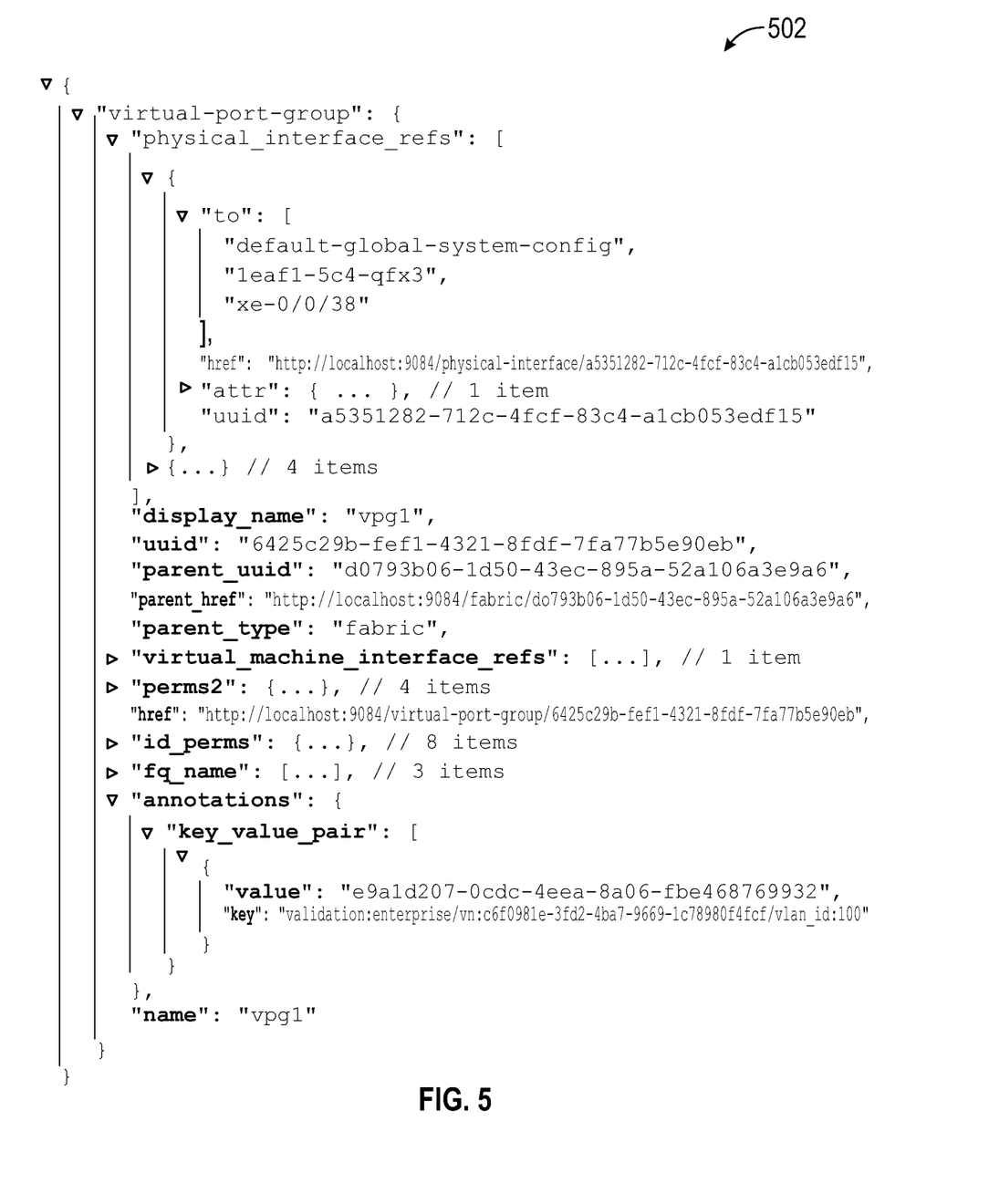
FIG. 5 is a diagram of an example of a virtual port group (VPG) object, according to techniques described in this disclosure.

FIG. 5 is a diagram of an example of a virtual port group (VPG) object, according to techniques described in this disclosure. FIG. 5 is described with reference to FIGS. 1-4 for example purposes only.

Contrail fabric may be based on leaf-spine architecture. In the leaf-spine architecture, the leaf may connected to the host or compute node. Ethernet VPNs (EVPN) with Virtual Extensible LANs (VXLAN) encapsulation may be used for Layer 2 connectivity between virtual machines and a top-of-rack (TOR) switch. In Contrail networking, a virtual port group (VPG) is a group of one or more physical interfaces attached to one or more virtual network interfaces. Each virtual network interface object corresponds to a VLAN ID and is attached to a Virtual Network (VN).

The representation of a VPG object 502 in Contrail is illustrated in FIG. 5. In this example, VPG "vpg1" is a group of one physical interface here, "xe-0/0/38" on leaf "leaf1-5c4-qfx3" with the virtual network with UUID "c6f0981e-3fd2-4ba7-9669-1c78980f4fcf" and VLAN ID "100" attached to the physical interface.

Figure 6:
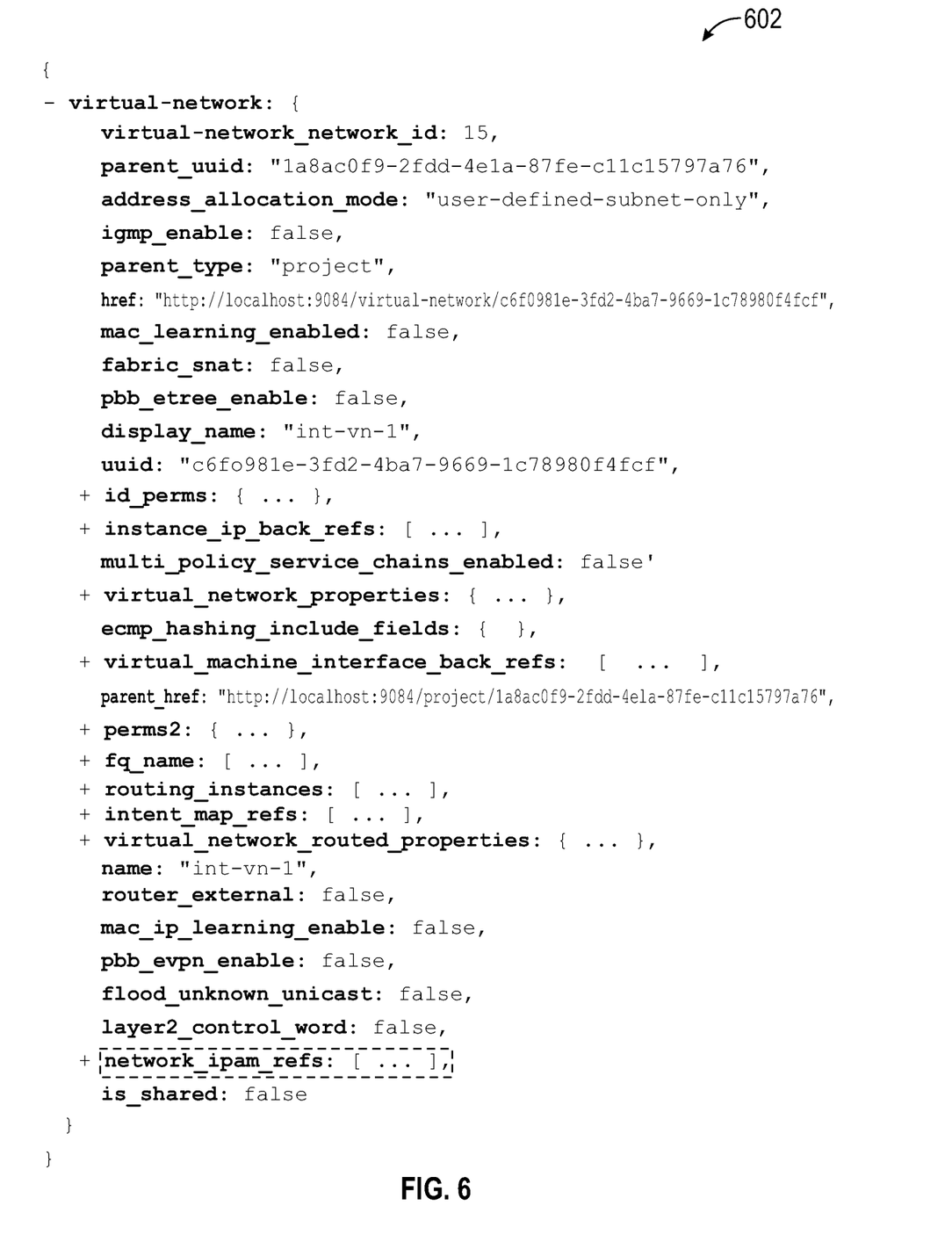
FIG. 6 is a diagram of an example of a configuration object, according to techniques described in this disclosure.

FIG. 6 is a diagram of an example of a configuration object, according to techniques described in this disclosure. FIG. 6 is described with reference to FIGS. 1-5 for example purposes only. In the example of FIG. 6, virtual Network with MAD "c6f0981e-3fd2-4ba7-9669-1c78980f4fcf" corresponds to contig object 602 of FIG. 6. Config object 602 corresponds to Virtual Network name as "int-vn-1" and VxLan network identifier(VNI) as "15".

A leaf may support gRPC streaming. If there is traffic across two BMSs, the GNMI sensor data for /network-instances/network-instance/macip-table macip-table on leaf leaf1-5c4-qfx3 connected to BMS (vpg1) gives below response:
{'key':'__prefix__',
'strValue': "/network-instances/network-instance[name='default-switch']/macip-table/entries/entry[vlan-name='v172+172']/"},
{'key': 'ip-address', 'strValue': '10.10.10.10'},
{'key': 'vlan-id', 'uintValue': 100},
'key': 'vni', 'uintValue': 15},
'key': 'interface', 'strValue': 'xe-0/0/38'}, In the above example, the key "ip-address" may correspond to the ip-address associated with the EVPN routing instance. The key "vni" may correspond to the VxLan Network Identifier. The key "interface" may correspond to the interface on which the mac-ip address is learned.

From above data, network analyzer 108 may map the Contrail Config data and gRPC sensor data. From this mapping of Contrail config data and gRPC sensor data, network analyzer 108 can determine that the IP address 10.10.10.10 is the IP Address of the remote. Network analyzer 108 may determine that the VxLan network identifier "vni" value 15 belongs to the Virtual Network "int-vn-1" and as the interface xe-0/0/38 on leaf leaf1-5c4-qfx3 corresponds to VPG vpg1. Accordingly, network analyzer 108 may determine that the IP address 10.10.10.10 belongs to vpg1. In this way, network analyzer 108 may create a link between the vpg1 and the leaf leaf1-5c4-qfx3, which may help to allow network analyzer 108 to determine a path for traffic generated between BMSs and to determine a source and destination of virtual network information from an sFlow packet.

Figure 7:
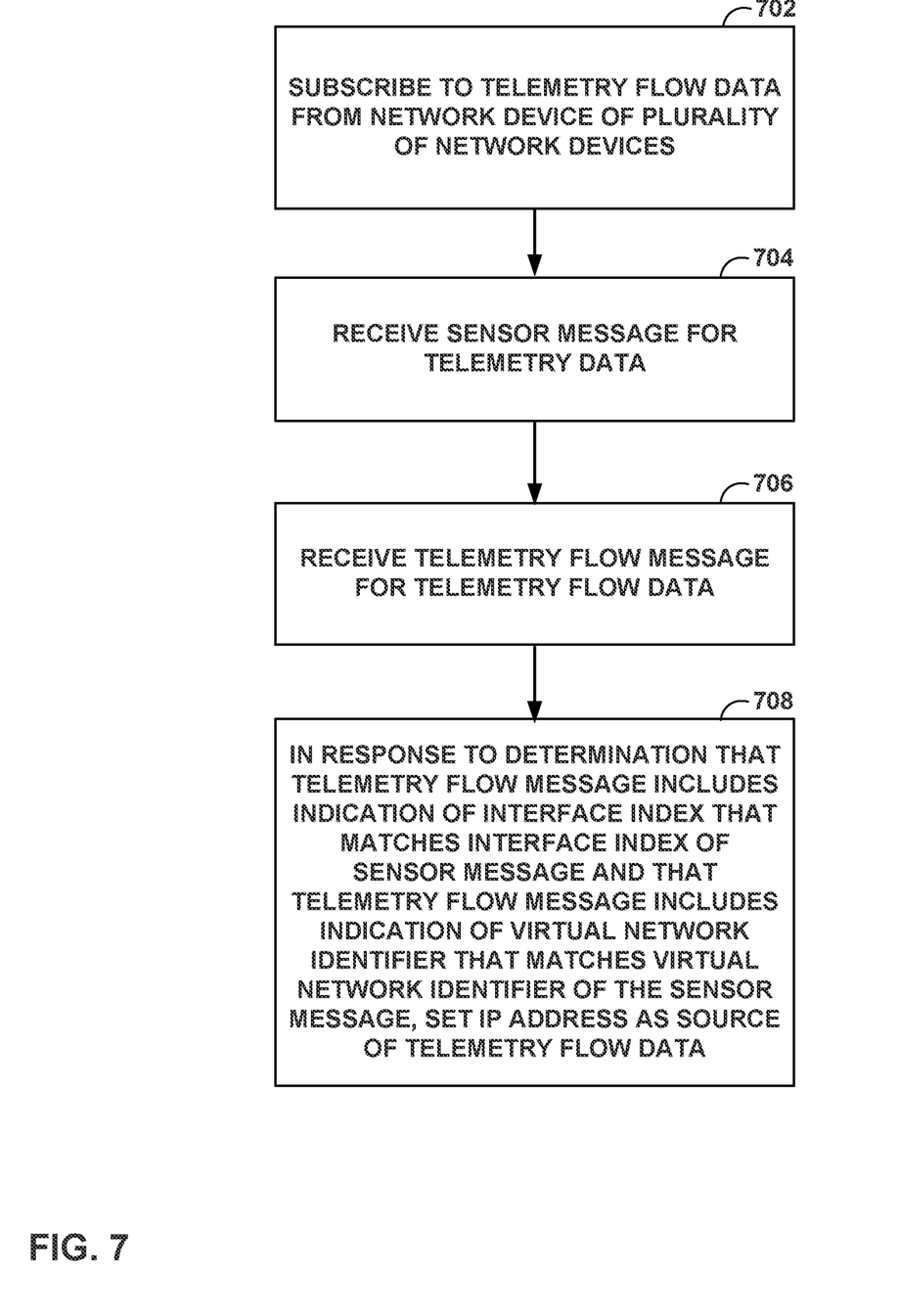
FIG. 7 is a flow diagram illustrating an example of determining telemetry information between bare metal servers (BMSs), according to techniques described in this disclosure.

FIG. 7 is a flow diagram illustrating an example of determining telemetry information between bare metal servers (BMSs), according to techniques described in this disclosure. FIG. 7 is described with reference to FIGS. 1-6 for example purposes only.

Network analyzer 108 may optionally subscribe to telemetry flow data from a network device of a plurality of network devices (702). For example, network analyzer 108 may subscribe to gNIMI sensor messages (/network-instances/network-instance/macip-table) and /network-instances/ network-instance[instance-name='name']/protocols/protocol/evpn/ethernet-segment/ over GRPC channel. The network devices may comprise, for example, a leaf in a leaf-spine architecture (see FIG. 4).

Network analyzer 108 may receive, from the network device, a sensor message for the telemetry flow data (704). The sensor message may indicate an interface index for a network interface, a virtual network identifier associated with a virtual network, and an IP address. The sensor message may comprise a gNMI sensor message. For example, Network analyzer 108 may consume a gNMI sensor messages sent by a leaf network device (e.g., leaf device 461. A response from macip-table sensor may include one or more of an interface name (e.g., a name of the interface on which the mac-ip address is learned, it is local to the leaf), an IP-address (e.g., an IP address associated with the EVPN routing instance, it is remote to this leaf which it is connected to), a Vni (e.g., a VxLan network identifier), or a Vlan-id (e.g., a vlan-id associated with the virtual network). Path flow engine 123 may create a map with index/key as interface-index and elan-id and value as IP-address and vni.

Network analyzer 108 may receive, from the network device, a telemetry flow message for the telemetry flow data (706). The telemetry flow message may include an sFlow message. For example, network analyzer 108 may receive sFlow data that includes an outer and/or an inner header of the packet which network analyzer 108 may sample along with a Simple Network Management Protocol (SNMP) ifIndex of the ingress and egress interface of the device on which the packet has arrived and sent out of the device, respectively.

Path flow engine 123 may, in response to a determination that the telemetry flow message includes an indication of an interface index that matches the interface index of the sensor message and that the telemetry flow message includes an indication of a virtual network identifier that matches the virtual network identifier of the sensor message, set the IP address as the source of the telemetry flow data (708). The source of the telemetry flow data may comprise a BMS. For example, path flow engine 123 may check if there is any match between an ingress SNMP if-index of the sFlow packets to the map as created by consuming gNMI messages. If a match is found, path flow engine 123 may designate that mapped IP-address as remote source of the packet.

Path flow engine 123 may determine a destination IP address of telemetry flow data. The destination of the telemetry flow data may comprise a BMS in this example, path flow engine 123 may, in response to determining that the telemetry flow message includes an indication of an interface index that matches an interface index of a second sensor message and that the telemetry flow message includes an indication of an virtual network identifier that matches the virtual network identifier of the second sensor message, set a destination IP address of the second sensor message as the destination of the telemetry flow data. For example, path flow engine 123 may check if there is any match between egress SNMP if-index of the sFlow packets to the map as created by consuming gNMI messages. If a match is found, path flow engine 123 may designate that mapped IP-address as remote destination of the packet.

In some examples, path flow engine 123 may determine the IP address (e.g., a source IP address and/or a destination IP address) based on an indication of a virtual local area network (VxLan) identifier. For example, path flow engine 123 may set the IP address as the source of the telemetry flow data in response to the determination that the telemetry flow message includes the indication of the interface index that matches the interface index of the sensor message and that the telemetry flow message includes the indication of the virtual network identifier that matches the virtual network identifier of the sensor message and further in response to determining that the telemetry flow message further includes an indication of a virtual local area network (VxLan) identifier that matches a VxLan identifier of the sensor message.

For instance, path flow engine 123 may check if there is any match between an ingress SNMP if-index and vlan id (if available) of the sFlow packets to the map as created by consuming gNMI messages, If a match is found, path flow engine 123 may designate that mapped IP-address as remote source of the packet. Similarly, path flow engine 123 may check if there is any match between an egress SNMP if-index and vlan id (if available) of the sFlow packets to the map as created by consuming gNIMI messages. If a match is found, path flow engine 123 may designate that mapped IP-address as remote destination of the packet.

Path flow engine 123 may determine a virtual port group (VPG) for the telemetry flow data based on a VPG object (e.g., see FIG, 5). For example, path flow engine 123 may use config data (e.g., Contrail config data, see FIG. 6) and sensor data (e.g., GRPC sensor data) to map an IP address, VNI, VPG, and virtual network to an interface of a network device (e.g., leaf 461).

Figure 8:
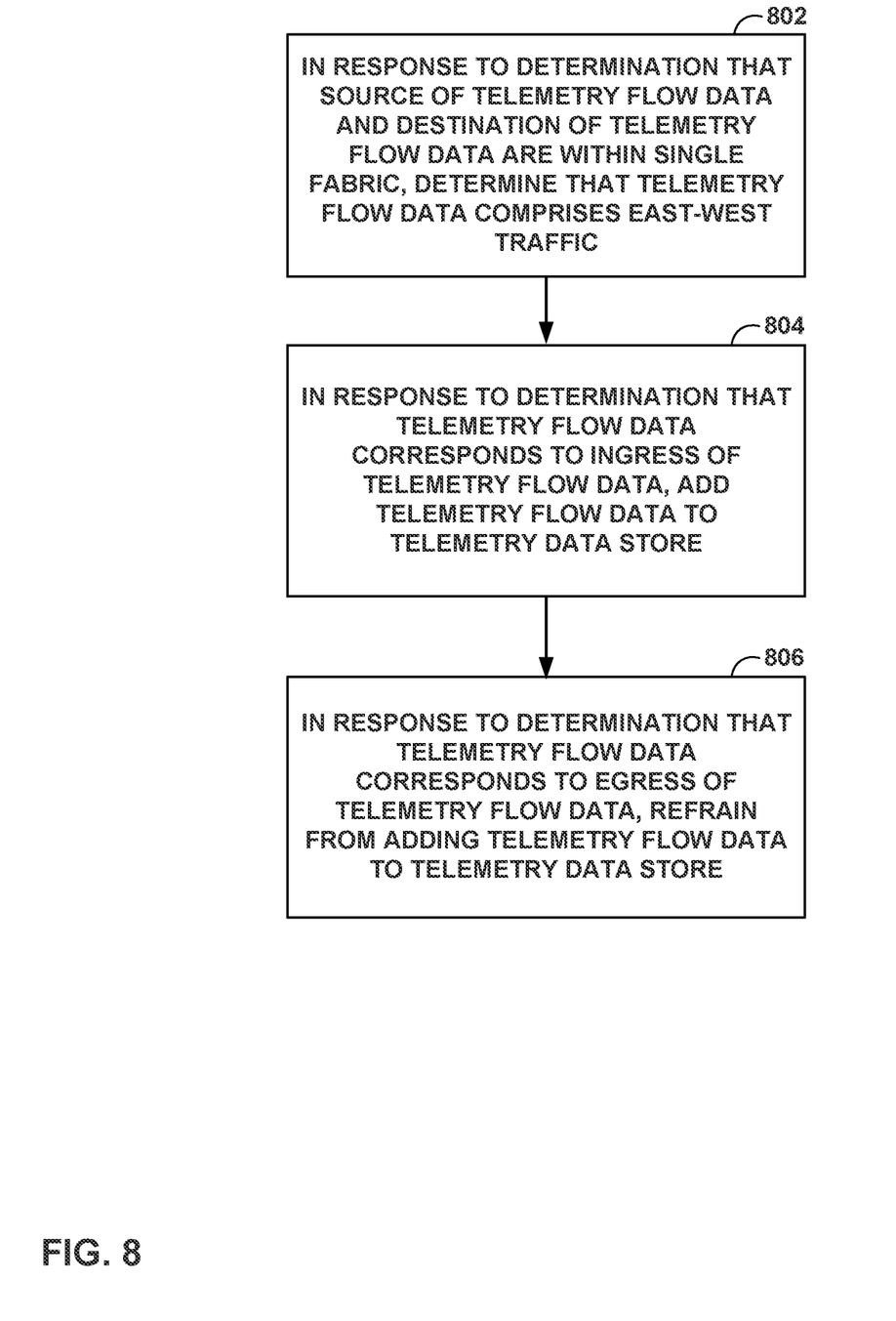
FIG. 8 is a flow diagram illustrating an example of correlating telemetry information for a flow between BMSs, according to techniques described in this disclosure.

FIG. 8 is a flow diagram illustrating an example of correlating telemetry information for a flow between BMSs, according to techniques described in this disclosure. FIG. 8 is described with reference to FIGS. 1-7 for example purposes only.

Duplicate flow detector 125 may, in response to determining that the source of the telemetry flow data and a destination of the telemetry flow data are within a single fabric, determining, by the network analyzer, that the telemetry flow data comprises east-west traffic (802). For example, duplicate flow detector 125 may determine whether a source and a destination are in the same Fabric (e.g. packets between BMSs 481-484). In response to determining that the source and a destination are in the same Fabric, duplicate flow detector 125 may that the telemetry flow data corresponds to east-to-west traffic.

Duplicate flow detector 125 may, in response to determining that the telemetry flow data corresponds to an ingress of the telemetry flow data, adding the telemetry flow data to a. telemetry data store (804). Duplicate flow detector 125 may, in response to determining that the telemetry flow data corresponds to an egress of the telemetry flow data, refraining from adding the telemetry flow data to the telemetry data store (806). For example, duplicate flow detector 125 may only add ingress sFlow data for the telemetry data flow, which may help to prevent double counting.

In some examples, duplicate flow detector 125 may, in response to a determination that the source of the telemetry flow data and a destination of the telemetry flow data are within a single fabric, determine that the telemetry flow data comprises east-west traffic. In this example, duplicate flow detector 125 may, in response to a determination that the telemetry flow data corresponds to an egress of the telemetry flow data, add the telemetry flow data to telemetry data store 224. Duplicate flow detector 125 may, in response to determining that the telemetry flow data corresponds to an ingress of the telemetry flow data, refrain from adding the telemetry flow data to telemetry data store 224. For example, duplicate flow detector 125 may only add egress sFlow data for the telemetry data flow, which may help to prevent double counting.

Duplicate flow detector 125 may, in response to a determination that the source of the telemetry flow data and a destination of the telemetry flow data are not within a single fabric, determine that the telemetry flow data comprises north-south traffic. In this example, duplicate flow detector 125 may, in response to a determination that the telemetry flow data comprises north-south traffic, add both the ingress and the egress of the telemetry flow data to telemetry data store 224 (e.g., all telemetry flow records are used).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
    receiving, by a network analyzer implemented in circuitry, from a network device of a plurality of network devices, a sensor message for telemetry flow data, the sensor message indicating an interface index for a network interface, a virtual network identifier associated with a virtual network, and an IP address;
    receiving, by the network analyzer, from the network device, a telemetry flow message for the telemetry flow data; and
    in response to determining that the telemetry flow message includes an indication of an interface index that matches the interface index of the sensor message and that the telemetry flow message includes an indication of a virtual network identifier that matches the virtual network identifier of the sensor message, setting, by the network analyzer, the IP address as the source of the telemetry flow data.

2. The method of claim 1, wherein setting the IP address as the source of the telemetry flow data is further in response to determining that the telemetry flow message further includes an indication of a virtual local area network (VxLan) identifier that matches a VxLan identifier of the sensor message.

3. The method of claim 1, wherein the network device comprises a first network device, the sensor message comprises a first sensor message, and the IP address is a source IP address, the method further comprising:
    in response to determining that the telemetry flow message includes an indication of an interface index that matches an interface index of a second sensor message and that the telemetry flow message includes an indication of an virtual network identifier that matches the virtual network identifier of the second sensor message, setting, by the network analyzer, a destination IP address of the second sensor message as the destination of the telemetry flow data.

4. The method of claim 1, further comprising determining, by the network analyzer, a virtual port group (VPG) for the telemetry flow data based on a VPG object.

5. The method of claim 1, further comprising:
    in response to determining that the source of the telemetry flow data and a destination of the telemetry flow data are within a single fabric, determining, by the network analyzer, that the telemetry flow data comprises east-west traffic;
    in response to determining that the telemetry flow data corresponds to an ingress of the telemetry flow data, adding the telemetry flow data to a telemetry data store; and
    in response to determining that the telemetry flow data corresponds to an egress of the telemetry flow data, refraining from adding the telemetry flow data to the telemetry data store.

6. The method of claim 1, further comprising:
    in response to determining that the source of the telemetry flow data and a destination of the telemetry flow data are not within a single fabric, determining, by the network analyzer, that the telemetry flow data comprises north-south traffic;
    in response to determining that the telemetry flow data corresponds to an egress of the telemetry flow data, adding the telemetry flow data to a telemetry data store; and
    in response to determining that the telemetry flow data corresponds to an ingress of the telemetry flow data, adding the telemetry flow data to the telemetry data store.

7. The method of claim 1, further comprising subscribing, by the network analyzer, to the telemetry flow data from the network device.

8. The method of claim 1, wherein the network device comprises a leaf in a leaf-spine architecture.

9. The method of claim 1, wherein the telemetry flow message comprises an glow message.

10. The method of claim 1, wherein the sensor message comprises a gNMI sensor message.

11. The method of claim 1, wherein the source of the telemetry flow data comprises a bare metal server.

12. A device comprising:
    processing circuitry; and
    memory comprising instructions that, when executed, cause the processing circuitry to:
    receive, from a network device of a plurality of network devices, a sensor message for telemetry flow data, the sensor message indicating an interface index for a network interface, a virtual network identifier associated with a virtual network, and an IP address;

receive, from the network device, a telemetry flow message for the telemetry flow data; and in response to a determination that the telemetry flow message includes an indication of an interface index that matches the interface index of the sensor message and that the telemetry flow message includes an indication of a virtual network identifier that matches the virtual network identifier of the sensor message, set, the IP address as the source of the telemetry flow data.

13. The device of claim 12, wherein the processing circuitry is configured to set the IP address as the source of the telemetry flow data further in response to a determination that the telemetry flow message further includes an indication of a virtual local area network (VxLan) identifier that matches a VxLan identifier of the sensor message.

14. The device of claim 12, wherein the network device comprises a first network device, the sensor message comprises a first sensor message, and the IP address is a source IP address and wherein the processing circuitry is further configured to:

in response to a determination that the telemetry flow message includes an indication of an interface index that matches an interface index of a second sensor message and that the telemetry flow message includes an indication of an virtual network identifier that matches the virtual network identifier of the second sensor message, set a destination IP address of the second sensor message as the destination of the telemetry flow data.

15. The device of claim 12, wherein the processing circuitry is further configured to determine a virtual port group (VPG) for the telemetry flow data based on a VPG object.

16. The device of claim 12, wherein the processing circuitry is further configured to:

in response to a determination that the source of the telemetry flow data and a destination of the telemetry flow data are within a single fabric, determine that the telemetry flow data comprises east-west traffic;

in response to a determination that the telemetry flow data corresponds to an ingress of the telemetry flow data, add the telemetry flow data to a telemetry data store; and in response to a determination that the telemetry flow data corresponds to an egress of the telemetry flow data, refrain from adding the telemetry flow data to the telemetry data store.

17. The device of claim 12, wherein the processing circuitry is further configured to:

in response to a determination that the source of the telemetry flow data and a destination of the telemetry flow data are not within a single fabric, determine that the telemetry flow data comprises north-south traffic;

in response to a determination that the telemetry flow data corresponds to an egress of the telemetry flow data, add the telemetry flow data to a telemetry data store; and in response to a determination that the telemetry flow data corresponds to an ingress of the telemetry flow data, add the telemetry flow data to the telemetry data store.

18. The device of claim 12, wherein the processing circuitry is further configured to subscribe to the telemetry flow data from the network device.

19. The device of claim 12, wherein the network device comprises a leaf in a leaf-spine architecture.

20. A non-transitory computer-readable storage medium comprising one or more instructions that cause processing circuitry to:

receive, from a network device of a plurality of network devices, a sensor message for telemetry flow data, the sensor message indicating an interface index for a network interface, a virtual network identifier associated with a virtual network, and an IP address;

receive, from the network device, a telemetry flow message for the telemetry flow data; and in response to a determination that the telemetry flow message includes an indication of an interface index that matches the interface index of the sensor message and that the telemetry flow message includes an indication of a virtual network identifier that matches the virtual network identifier of the sensor message, set, the IP address as the source of the telemetry flow data.

* * * * *

UNITED STATES PATENT AND TRADEMARK OFFICE
CERTIFICATE OF CORRECTION

PATENT NO. : 11,765,488 B1
APPLICATION NO. : 17/649316
DATED : September 19, 2023
INVENTOR(S) : SelvaKumar Sivaraj, Prasad Miriyala and Biswajit Mandal Page 1 of 1

It is certified that error appears in the above-identified patent and that said Letters Patent is hereby corrected as shown below:

In the Claims

Column 16, Line 54 (Claim 9): Replace "an glow" with --an sFlow--

Signed and Sealed this
Twenty-fifth Day of November, 2025

John A. Squires
*Director of the United States Patent and Trademark Office*